Nov. 13, 1923.
E. J. GREENE
SERVE SELF MOTOR STORE
Filed Oct. , 1922
1,473,850
2 Sheets-Sheet 1
Fig. 1.
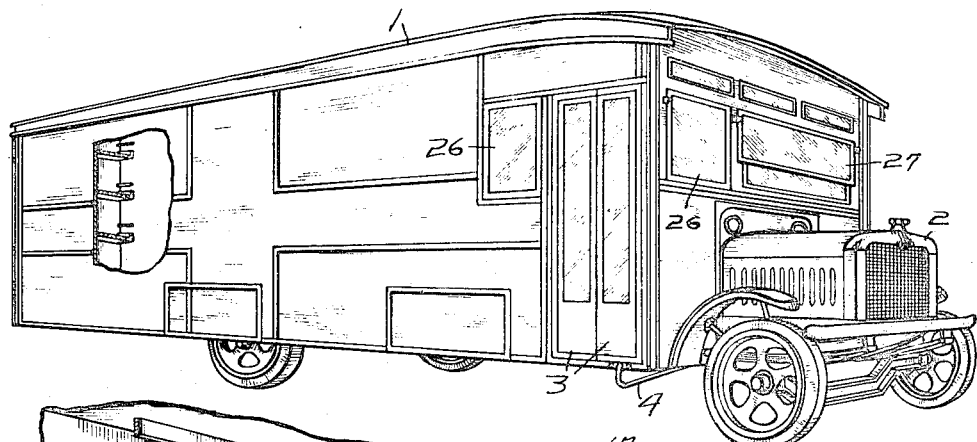
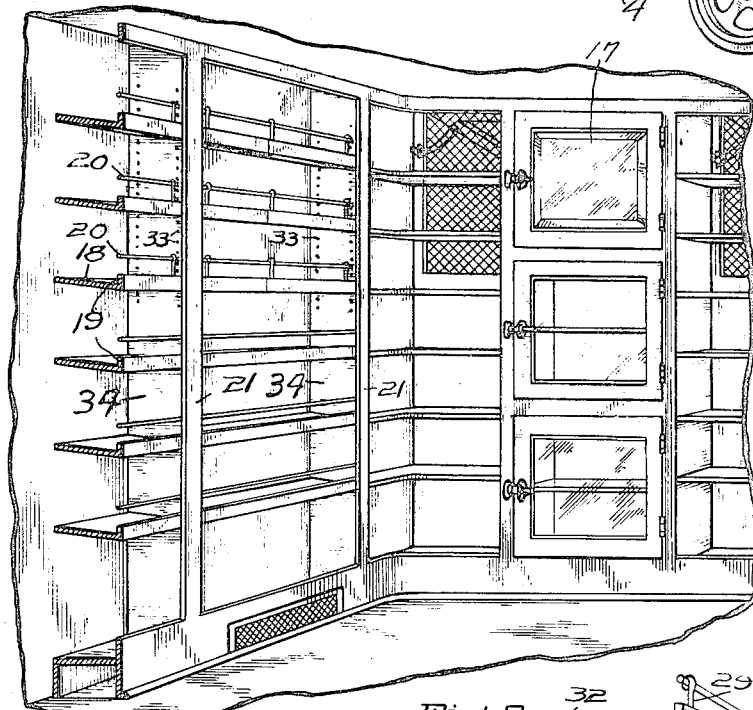
Fig. 2.
Fig. 4.
Fig. 3.
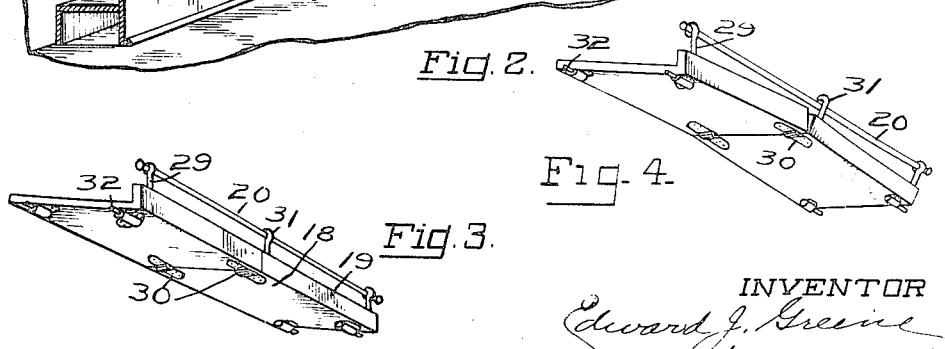
INVENTOR
Edward J. Greene
by
Owen, Owen & Crampton Nov. 13, 1923.
E. J. GREENE
1,473,850
SERVE SELF MOTOR STORE
Filed Oct. 9, 1922   2 Sheets-Sheet 2
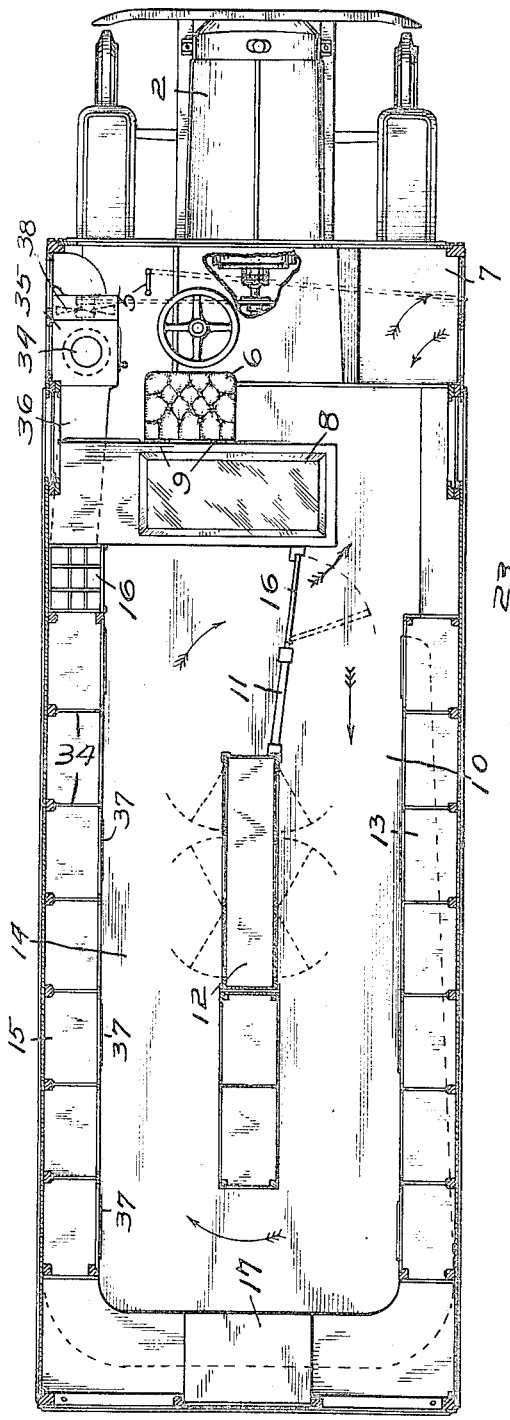
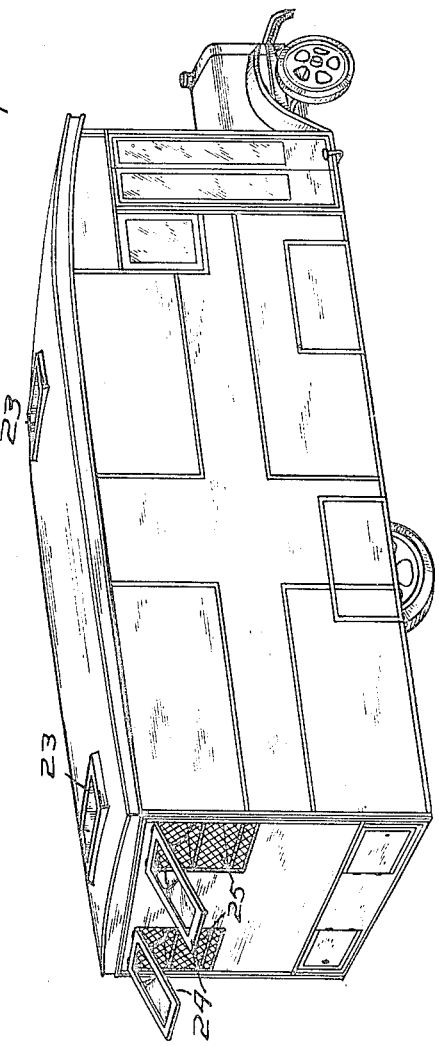
INVENTOR
Edward J. Greene Patented Nov. 13, 1923.

1,473,850

UNITED STATES PATENT OFFICE.

EDWARD J. GREENE, OF TOLEDO, OHIO.

SERVE-SELF MOTOR STORE.

Application filed October 9, 1922. Serial No. 593,279.

*To all whom it may concern:*

Be it known that I, EDWARD J. GREENE, a citizen of the United States, and a resident of Toledo, in the county of Lucas and State of Ohio, have made an invention appertaining to Serve-Self Motor Stores; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.
My invention has for its object to provide an efficient serve self motor store wherein the goods are supported and arranged in the store to more efficiently display the goods, notwithstanding the limited space that stores of this type would necessarily involve. It also has for its object to provide an arrangement of shelving which is particularly efficient in conjunction with such motor stores. It also has for its object to arrange aisles and a checking out desk that are particularly efficient in supervising and conducting the store business, particularly of the motor truck type. The invention also has for its object the proper ventilation and heating of such stores. These features of the invention produce an exceedingly efficient motor store.

The invention is illustrated in the accompanying drawings and will be described hereinafter.

Figure 1 of the drawings is a perspective view of the outside of the store. Fig. 2 illustrates a corner of the store showing the arrangement of the shelves. Fig. 3 is a perspective view looking particularly at the underside of one of the shelves. Fig. 4 shows the shelf in a semi-folded position. Fig. 5 is a plan view of the store. Fig. 6 is a perspective view showing the means of ventilating the store.

1 in the figures is an automobile store body which is mounted on the chassis of any well known truck 2 operated by an internal combustion engine of any type well known in the art. 3 are the entering and exit doors which may be operated by a suitable bar 4 connected to a bell crank lever 5 which has an arm located in proximity to the driver's seat 6 in position where it may be manipulated by the driver.

The doors 3 are located at one side near one end of the store, and an entrance hall or platform 7 located within the store is so situated with reference to the driver's seat as to give to the driver full knowledge of those entering and those departing. Behind the driver's seat 6 is located the checking out desk 8. The desk 8 extends the greater distance across the store and is located just back of the seat 6. The seat 6 is hinged by means of the hinges 9 to the desk 8 and consequently the seat 6 may be raised, which gives ample standing room for the driver to check off the customers as they leave the store.

An entering aisle 10 extends from the entering hall and along one side of the store, and is defined by the end of the checking desk, the railing 11, the central casing 12 located in the center of the car and extending lengthwise of the car or store, and the casing or shelving 13 located along the side of the store body. The customers are thus compelled to pass through the aisle 10, and consequently across the end of the checking out desk 8, and so as to be observed by the driver. The rear end of the aisle 10 leads to the aisle 14 which is defined by the central casing 12, the railing 11, and the side casing 15. A gate 16 is located in the railing 11 and in front of the checking out desk 8, and affords an egress from the store to a part of the aisle 10 and the hall 7, again giving opportunity for complete observation by the driver of the customers passing, and notation of the packages they are carrying. The arrangement thus produces an exceedingly efficient means not only for maintaining the comfort of the customers, but also for establishing a system in the confined area of a motor truck store whereby all may be rapidly and easily served, and also whereby there will be no loss to the driver who operates the store.

The tiers of shelves or cases contain the various classes of goods that are commonly found in stores of the particular line that it is desired to be handled by the store. Where groceries are handled, the shelves and casing are constructed to contain the different classes of goods that are commonly found in grocery stores such as dry products, canned goods, meats, bottled goods, etc. For this purpose cases having doors, such as part of the case 12, may be utilized; cases having open shelves, such as the cases 13 and 15 are provided; racks for bottled goods, such as the rack 16, are used, and refrigerators, such as the refrigerator 17, may be installed. As the goods in grocery stores are greatly varied, and as a great variety of brands of each class of goods are handled, it is necessary not only to provide for the sale of this great variety of classes and brands of each class, but also it is necessary to arrange them so that the brands may be readily distinguished and obtained. Furthermore, in view of the fact that the customers will take from the shelves or casings the packages or receptacles containing the goods that are nearest to them, namely, those nearest to the edge of the shelves, it ordinarily operates to prevent a full display of the goods. Furthermore, the moving of the store over the road ordinarily causes the goods to scatter on the shelves.

By my invention I have provided a means whereby the goods in the operation of the store will be automatically maintained in display position, notwithstanding the removal of the packages from the shelves. The shelves 18 are inclined at a very slight angle, substantially as shown in Fig. 2, in order to cause the goods, particularly the package goods, to be brought forward, that is, toward the center lines of the aisles 10 and 14. The front edges of the shelves 18 are provided with flanges 19 for preventing the goods from slipping from the shelves. The flanges 19 are comparatively low in height. In order to prevent the goods from being thrown onto the floor suitable bars or strips 20 may also be located above the front edges of the shelves 18.

In order that the shelves may be readily changed so as to provide ample room for a particular line or brand of goods or in order to reduce the space provided for a particular line, means is provided for folding or semi-folding, and for adjustably securing the shelves. The bars 20 are located in short eye-bolts 29 that are secured each at one end to a shelf and a pair to the ends of ecah shelf. The rods 20 are located in the eyes of the bolts 29. Each shelf is divided into two parts hingedly connected together by the hinges 30, located on the bottom side of the shelves. The eyes of the bolts are sufficiently large to permit the parts of the shelf to move relative to each other. A hook bolt 31 is located near the hinges and is connected to one of the parts of each shelf so as to engage the bar 20 when the parts of the shelf are located in the same plane. The hooks 31 thus prevent sagging of the central portions of the shelves The ends of each of the shelves are provided with slidable bolts 32 that may be inserted in holes 33 formed in the partitions 34 located between tiers of shelves. By this means the shelves may be readily changed in their positions and secured in any position. The bolts 32 may be withdrawn from the holes 33 and in order to permit free movement between the partitions they may be partially folded together by movements of parts of the shelves on the hinges 30. The parts of the shelves may then be placed in the same plane and the bolts 32 pushed into the holes 33 which will securely hold the shelves in the positions in which they are placed.

The shelving structure otherwise may be of a character suitable for motor truck stores, they being secured in position by suitable uprights, such as the uprights 21, to which the front edges of the shelves and the bars 20 may be secured. If desired, between the uprights may be provided doors having transparent sheet material or lights, such as glass or celluloid, or any other suitable material, in order that the goods may be displayed, and in order that the goods may be properly protected, either from atmospheric conditions, such as dust or humidity, or in order that proper thermic conditions may be maintained. The checking out desk 8 may also be covered with a transparent material, preferably glass, and may contain a refrigerator whereby meats may be displayed and may be cut by the driver as directed by the customers.

Suitable ventilators, such as the ventilators 23 located in the top of the truck or store body 1 may be provided, and also the rear windows 24 may be provided, which may be opened to allow air to pass through the screens 25. The front end of the store may be provided with the windows 26 as well as the usual windshield 27.

In order that the car may be heated, particularly in the winter time, a stove 34 may be located in the vestibule of the car. The stove 34 is encased in a sheet metal box 35 and a flue 36 extends beneath the tiers of shelves 13 and 15 and communicates with openings or registers 37. A fan or blower 38 may be operated by the engine of the truck to blow air through the box 35 and the flue 36 and out through the registers 37.

The arrangement consequently is such that the goods may be selected and properly dispensed and wrapped, if desired, and the entire system may be manipulated or controlled by the driver with ease and dispatch. The store thus constitutes an exceedingly efficient concrete means whereby an exceedingly important service may be rendered to the public to its perfect convenience and great advantage.

I claim:

1. In a serve self motor store having a driver's vestibule, a checking desk, a driver's seat located in the vestibule in front of and against the checking desk, an entering vestibule for customers located beside the driver's vestibule, an entering hall for customers located beside the checking desk, tiers of shelves located at the sides of the motor store, a central tier and railing extending along the central line of the store and forming a hall extending from the entering hall along the sides and around the rear end of the central tier of shelves back to the checking desk, a gate located in the railing at the checking desk whereby the driver can attend to the customers from the time they step into the vestibule until they leave the customer's vestibule.

2. In a serve self motor store having a driver's vestibule, a plurality of tiers of shelves, a partition located between the tiers of shelves, eye-bolts connected to the ends of the shelves and rods located in the eyes of the eye-bolts and extending over the forward edges of the shelves, the shelves having parts hingedly connected together, and hook bolts for engaging the central portions of the rods when the parts of each shelf are located in the same plane.

In testimony whereof, I have hereunto signed my name to this specification.

EDWARD J. GREENE.